US011132762B2

(12) United States Patent
Bedi et al.

(10) Patent No.: US 11,132,762 B2
(45) Date of Patent: Sep. 28, 2021

(54) CONTENT AWARE IMAGE FITTING

(71) Applicant: ADOBE INC., San Jose, CA (US)

(72) Inventors: Amish Kumar Bedi, Naya Nangal (IN); Sanyam Jain, New Delhi (IN); Jianming Zhang, Campbell, CA (US)

(73) Assignee: ADOBE INC., San Jose, CA (US)

( * ) Notice: Subject to any disclaimer, the term of this patent is extended or adjusted under 35 U.S.C. 154(b) by 130 days.

(21) Appl. No.: 16/557,058

(22) Filed: Aug. 30, 2019

(65) Prior Publication Data

US 2021/0065332 A1   Mar. 4, 2021

(51) Int. Cl.
*G06K 9/46*     (2006.01)
*G06T 3/00*     (2006.01)
*G06K 9/72*     (2006.01)
*G06T 7/60*     (2017.01)
*G06K 9/62*     (2006.01)
*G06T 3/40*     (2006.01)
*G06T 7/33*     (2017.01)
*G06T 7/70*     (2017.01)

(52) U.S. Cl.
CPC .......... *G06T 3/0068* (2013.01); *G06K 9/4676* (2013.01); *G06K 9/6256* (2013.01); *G06K 9/726* (2013.01); *G06T 3/40* (2013.01); *G06T 7/33* (2017.01); *G06T 7/60* (2013.01); *G06T 7/70* (2017.01); *G06T 2207/20092* (2013.01)

(58) Field of Classification Search
CPC .............................. G06T 3/0068; G06T 7/60; G06T 7/33; G06T 3/40; G06T 7/70; G06T 2207/20092; G06K 9/726; G06K 9/4676; G06K 9/6256
USPC ........................................................ 382/159
See application file for complete search history.

(56) References Cited

U.S. PATENT DOCUMENTS

| | | | |
|---|---|---|---|
| 9,626,768 B2* | 4/2017 | Tumanov | G06T 7/149 |
| 10,140,675 B2* | 11/2018 | Sowden | H04N 1/00185 |
| 2013/0101210 A1* | 4/2013 | Tang | G06K 9/3233 382/165 |
| 2015/0206169 A1* | 7/2015 | Ye | G06Q 30/0242 705/14.41 |
| 2016/0277712 A1* | 9/2016 | Michot | G06T 7/60 |
| 2017/0364752 A1* | 12/2017 | Zhou | H04R 1/326 |
| 2018/0189325 A1* | 7/2018 | Hohwald | G06N 3/0454 |
| 2018/0293775 A1* | 10/2018 | Janas | G06T 13/80 |
| 2018/0300293 A1* | 10/2018 | Lee | G06F 40/106 |
| 2019/0132648 A1* | 5/2019 | Zimmerman | H04N 21/47202 |

* cited by examiner

*Primary Examiner* — Ali Bayat
(74) *Attorney, Agent, or Firm* — F. Chau & Associates, LLC

(57) ABSTRACT

Systems and methods are described for dynamically fitting a digital image based on the saliency of the image and the aspect ratio of a frame are described. The systems and methods may provide for identifying an aspect ratio of the frame, selecting a salient region of the digital image based on the aspect ratio using a saliency prediction model, and fitting the digital image into the frame so that a boundary of the frame is aligned with a boundary of the salient region.

17 Claims, 9 Drawing Sheets

CONTENT AWARE IMAGE FITTING

BACKGROUND

The following relates generally to fitting a digital image to a frame, and more specifically to dynamically fitting a digital image based on the aspect ratio of a frame.

In graphics design, when a graphic asset such as a Portable Network Graphics (PNG) or a Joint Photographic Experts Group (JPEG) image is needed to be placed into a design application, it is a challenge to appropriately fit that graphic in the design frame created by the designer. Publishing and image processing applications use various image fitting techniques for fitting a digital image to a frame. Thus, various Auto Fit methods may be used to automatically fit, stretch, or fill the image to the box.

If the size of the box is changed, the user may apply the same or a different method to the original source image to fit the image to the new frame. However, in some cases these methods result in suboptimal selection of a salient region that is viewable within the frame. Some of these methods do not take into account image content. Furthermore, automated processes for fitting an image to a frame may not consider changes in frame dimensions or image metadata during a resize operation.

In some cases, fitting operations also require manual input from a user. For example, the user may manually scale, translate, rotate, pan, or otherwise transform the desired relevant portion of an image in the frame (i.e., if the image's salient regions are not automatically detected). In some cases, the user may manually apply recursive scaling and translations. Unless the image is large, zooming and panning actions may be needed to correctly fit the desired regions of image in the frame, thereby leading to numerous time consuming steps performed by the user.

In the various prior techniques, the source image is resized, cropped, or otherwise transformed to fit into the frame, either manually or automatically. To make a good fit, the manual process can be tedious, laborious and time consuming while automatic transformations may result in undesirable effects such as distortions or cropping that fail to capture the desired portions of the image.

SUMMARY

A method, apparatus, and non-transitory computer readable medium for fitting a digital image based on the aspect ratio of a frame are described. Embodiments of the method, apparatus, and non-transitory computer readable medium identify an aspect ratio of the frame, select a salient region of the digital image based on the aspect ratio using a saliency prediction model, and fit the digital image into the frame so that a boundary of the frame is aligned with a boundary of the salient region.

Another method, apparatus, and non-transitory computer readable medium for fitting a digital image based on the aspect ratio of a frame are described. Embodiments of the method, apparatus, and non-transitory computer readable medium generate a saliency map for the digital image, wherein the saliency map comprises a saliency score for each pixel of the digital image; identify a plurality of region sizes corresponding to an aspect ratio of the frame; identify a plurality of region positions for each of the plurality of region sizes; calculate a total saliency score for each of the region positions based on the saliency map; select a salient region of the digital image based on the total saliency score for each of the region positions using a saliency prediction model; and fit the digital image into the frame so that a boundary of the frame is aligned with a boundary of the salient region.

Another method, apparatus, and non-transitory computer readable medium for dynamically fitting a digital image based on the aspect ratio of a frame are described. Embodiments of the method, apparatus, and non-transitory computer readable medium receive sizing input for the frame from a user; identify an aspect ratio of the frame based on the sizing input; select a salient region of the digital image based on the aspect ratio using a saliency prediction model; and dynamically fit the digital image into the frame in real time so that a boundary of the frame is aligned with a boundary of the salient region.

DETAILED DESCRIPTION

Figure 1:
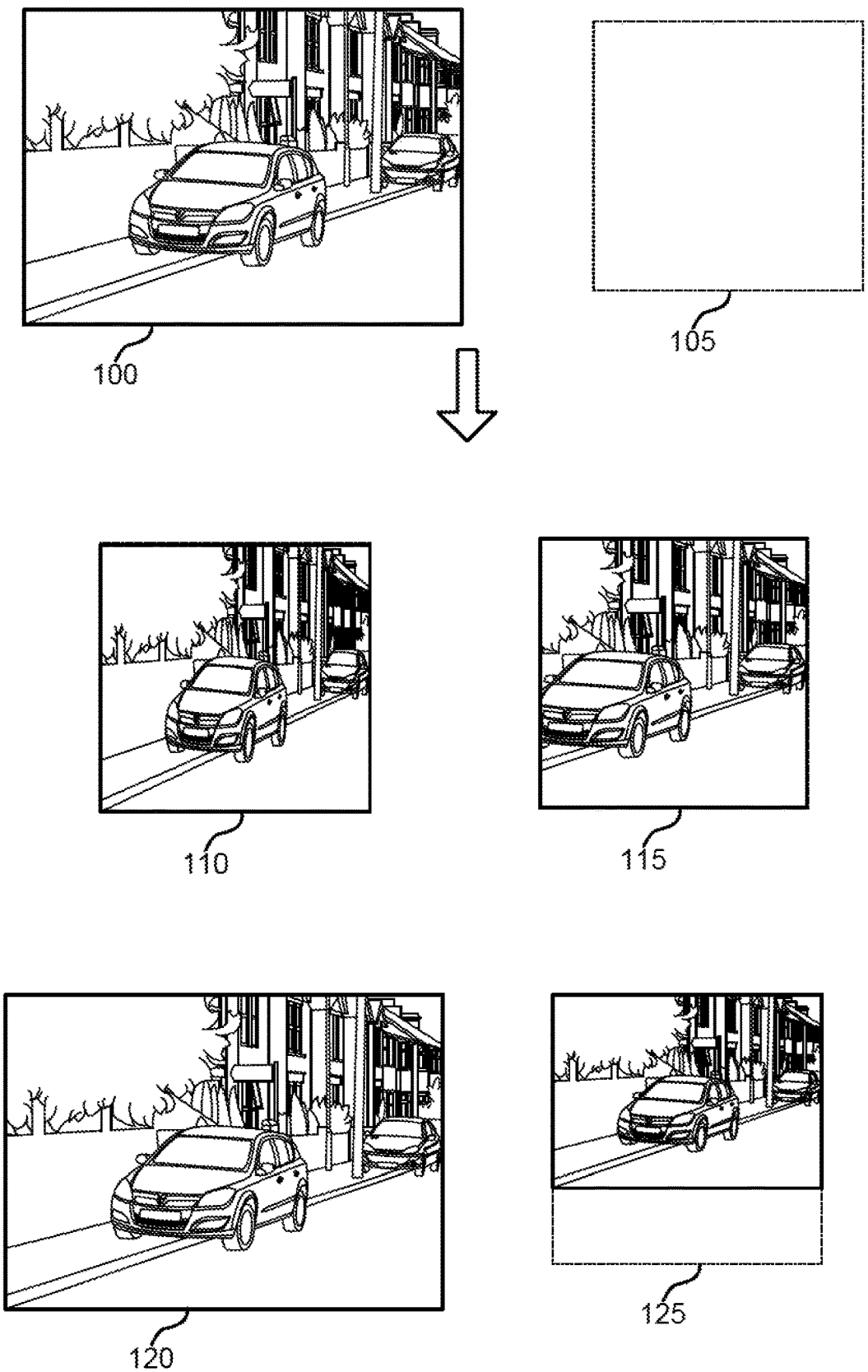
FIG. 1 shows several examples of conventional methods of fitting an image to a frame.

Embodiments of the present disclosure provide systems and methods for content aware fitting of a digital image to a frame. The term "content aware fitting" as used herein may refer to fitting a salient region of the digital image into a frame using a saliency prediction model, and further based on the aspect ratio of the frame. Thus, content aware fitting takes the content of the digital image (as expressed by the output of the saliency prediction model) into account when selecting the portion of the image that will be fit into the frame.

Publishing and image editing applications often include a function for importing digital images. In some cases, these images may be fit into a frame that has a different size than the original image. In order to do this, the digital image is fit into the frame using one of several fitting methods, which can be either automatic, manual, or a combination of both. Manual methods can be extremely time intensive, especially when numerous images are being imported. Automatic fitting methods, on the other hand, often result in a distorted image, or an image that is cropped in a way that doesn't capture the key elements of an image.

Thus, the present disclosure provides systems and methods for automatically fitting digital images into a frame that dynamically captures the salient regions of the digital image based on the aspect ratio of the frame. Thus, if the frame size is changed, the digital image can be dynamically updated in real time. Here, the term "real time" may refer to a process that is sufficiently fast to be included in the normal course of inputting an image into a frame without a user switching to another task (i.e., less than a few seconds).

The system and methods described in the present disclosure may identify an aspect ratio of the frame, select a salient region of the digital image based on the aspect ratio, and fit the digital image into the frame so that a boundary of the frame is aligned with a boundary of the salient region. In some embodiments, the saliency region is selected using a machine learning model.

By using a predictive model that takes the aspect ratio of the frame into account, some embodiments of the systems and methods described herein provide for an import function that reacts to the size of the frame in real time, while ensuring a higher likelihood that the most relevant portions of an image will be included within the frame. The selected salient region may not be selected to maximize the portion of the digital image that remains viewable. Rather, in some cases a smaller region may be selected that provides a more relevant portion of the image. If the user then changes the size of the frame (specifically, the aspect ratio) the salient region may be dynamically updated, and may include different portions of the image. The fitted image is a significant improvement in the relevancy of the viewable portion of the image compared to alternative automated fitting methods, and substantial time savings is realized over manual methods of image fitting.

FIG. 1 shows several examples of conventional methods of fitting an image to a frame. The example shown includes digital image 100, frame 105, fit-Content-to-frame method 110, fill-frame-proportionally method 115, fit-frame-to-content method 120, and fit-content-proportionally method 125.

The fit-content-to-frame method 100 resizes content to fit the frame and allows the content's proportions to be changed where the frame may not change, but the content may appear to be stretched if the content and the frame have different proportions.

The fill-frame-proportionally method 115 resizes content to fill the entire frame while preserving the content's proportions where the frame's dimensions are not changed. If the content and the frame have different proportions from one another, some of the content may be cropped by the bounding box of the frame (i.e., the right side of the image in this example).

The fit-frame-to-content method 120 resizes the frame to fit its content where the frame's proportions are altered to match the content proportions. Thus, this technique is ineffectual if the resized frame is not in the dimension needed.

The fit-content-proportionally method 125 resizes content to fit the frame while preserving the content proportions where the frame's dimensions are not changed. If the content and the frame have different proportions, empty space may be a result.

Other methods (not shown) include: the center-content method, which centers content within the frame where the proportions of the frame and its contents are preserved, and the size of the content and frame is unaltered; and the fit-box/fill-box method, which shows the complete image to be viewed in a selected box. The fill function leaves no space around the image, filling the box completely with the selected image. The fill function may crop out portions of the original image.

Each of these conventional Auto-fit methods has undesirable effects that make them unsuitable for certain image fitting applications.

Figure 2:
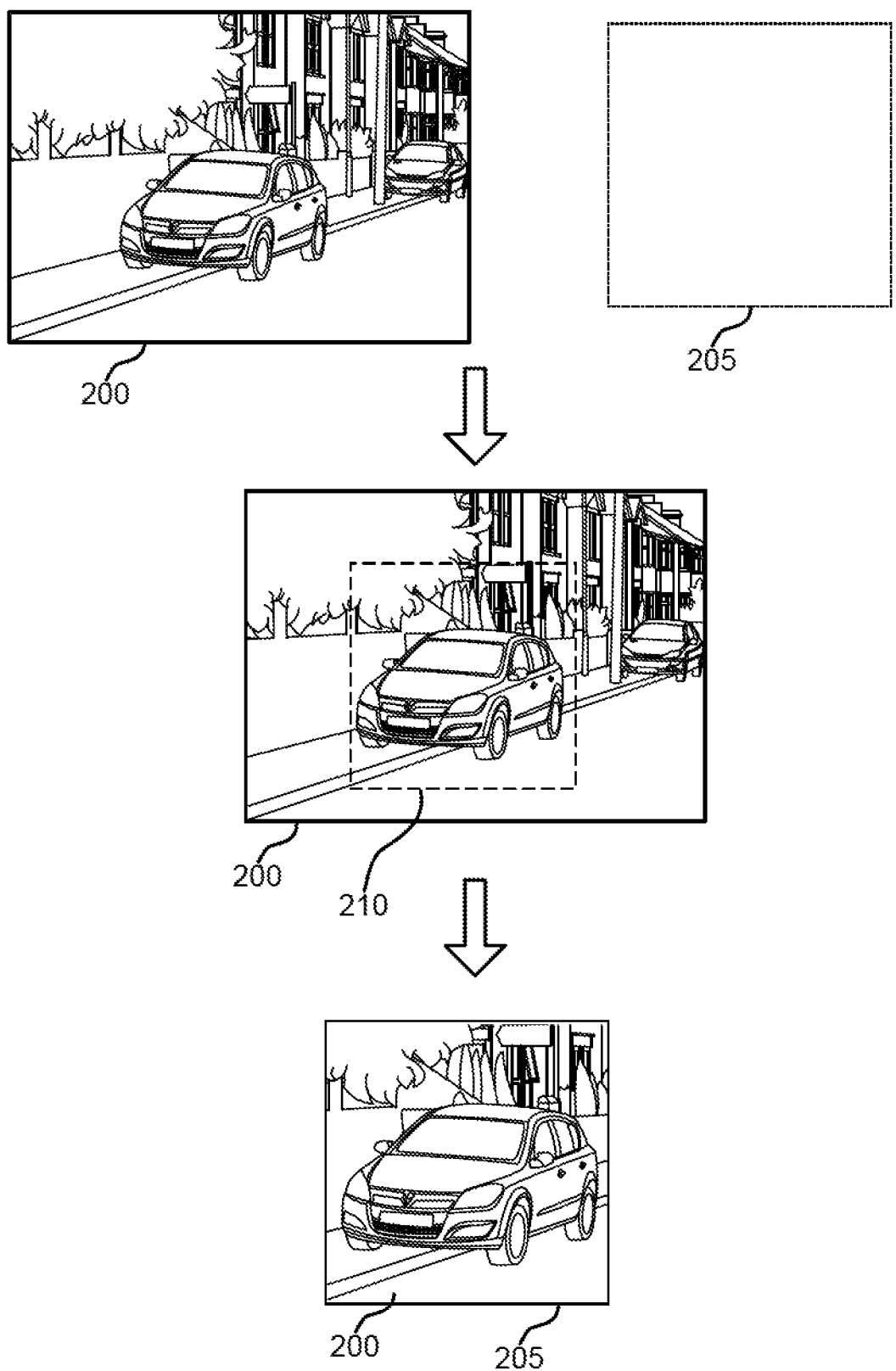
FIG. 2 shows an example of a diagram of a fitting process in accordance with aspects of the present disclosure.

FIG. 2 shows an example of a fitting process (i.e., the content-aware-fit method) in accordance with aspects of the present disclosure. The example shown includes digital image 200, frame 205, and salient region 210. The content-aware fitting process allows an image to be automatically fit to a frame in a manner that retains the size of the frame 205 and selects a salient region 210 of the digital image 200. The salient region 210 has the same dimensions as the frame 205, but not necessarily the same size. This allows additional flexibility in selecting the salient region 210 that will display the most important aspects of the digital image 200.

Initially, the digital image 200 is independent of the frame 205. However, once the user initiates the fitting operation, the systems and methods described herein may be used to identify a salient region 210 that has the same aspect ratio as the frame 205 using a saliency prediction model and taking into account the desired aspect ratio.

The digital image 200 may be fit into the frame 205 such that only the salient region 210 is visible. That is, the boundary of the frame 205 determines a size of the visible region of the digital image 200. In some cases, the digital image 200 is scaled and positioned such that the boundaries of the salient region 210 correspond to the boundary of the frame 205.

The boundaries of the resized and cropped digital image 200 (that displays only the salient region 210) are not necessarily centered on the image, or aligned with any original boundary of the digital image 200. Thus, the content-aware fit method may provide an auto-fit method that provides a more suitable fit than the conventional methods described with reference to FIG. 1.

Figure 3:
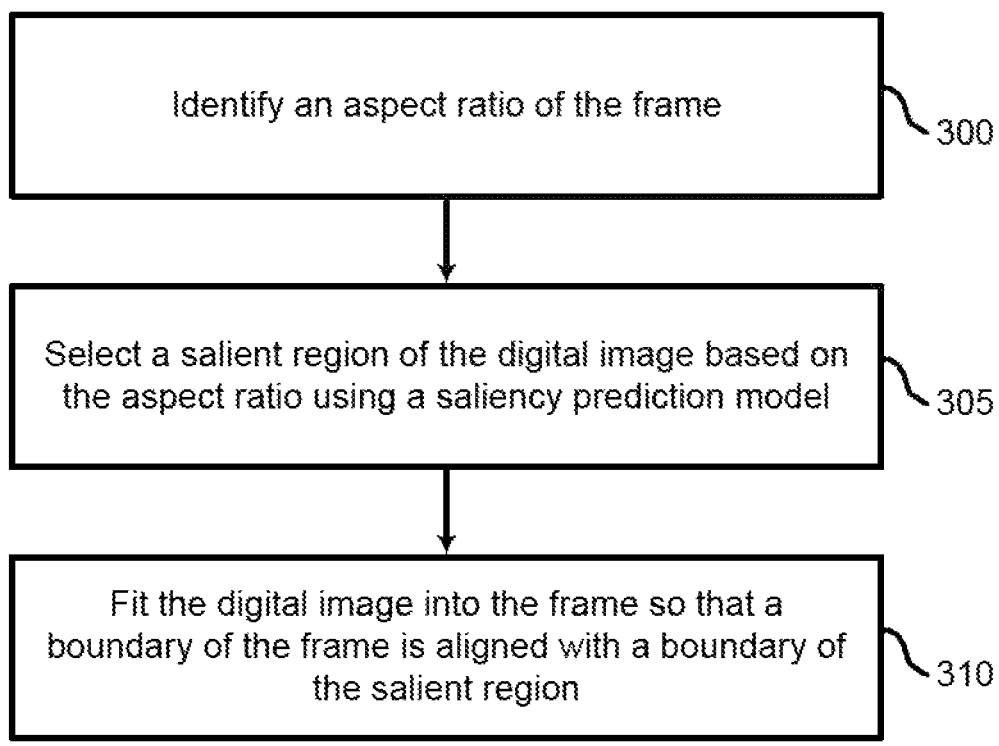
FIG. 3 shows an example of a process for dynamically fitting a digital image based on the aspect ratio of a frame in accordance with aspects of the present disclosure.

FIG. 3 shows an example of a process for dynamically fitting a digital image based on the aspect ratio of a frame in accordance with aspects of the present disclosure. In some examples, these operations may be performed by a system including processor executing a set of codes to control functional elements of an apparatus (e.g., server 900 described with reference to FIG. 9). Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 300, the system identifies an aspect ratio of the frame. In some cases, the operations of this step may refer to, or be performed by, a frame component as described with reference to FIG. 9. An example embodiment of a process for identifying the aspect ratio is described in further detail with reference to FIG. 4.

For example, in some cases, the system may determine dimensions of the frame and calculate the aspect ratio of the frame based on the dimensions. Specifically, the aspect ratio may be calculated as the ratio of the width to the height of the frame. In some cases, the system may receive sizing input from a user, wherein the dimensions are determined based on the sizing input, and wherein the digital image is fit into the frame in real time based on the sizing input.

At step 305, the system selects a salient region of the digital image based on the aspect ratio using a saliency prediction model. In some cases, the operations of this step may refer to, or be performed by, a saliency component as described with reference to FIG. 9. An example embodiment of a process for selecting the salient region is described in further detail with reference to FIG. 5.

For example, in some cases, the system including the saliency prediction model may generate a saliency map for the digital image, wherein the saliency map comprises a saliency score for each pixel of the digital image; identify a plurality of region sizes corresponding to the aspect ratio; identify a plurality of region positions for each of the plurality of region sizes; and calculate a total saliency score for each of the region positions based on the saliency map, wherein the salient region is selected based on the total saliency score.

At step 310, the system fits the digital image into the frame so that a boundary of the frame is aligned with a boundary of the salient region. In some cases, the operations of this step may refer to, or be performed by, a fitting component as described with reference to FIG. 9. An example embodiment of a process for fitting the digital image into the frame is described in further detail with reference to FIG. 6.

In some cases, the system may identify a transformation of the frame; set a transformation matrix of the frame to an identity value (i.e., undo the transformations); and reapply the transformation to the frame after inserting the digital image.

Figure 4:
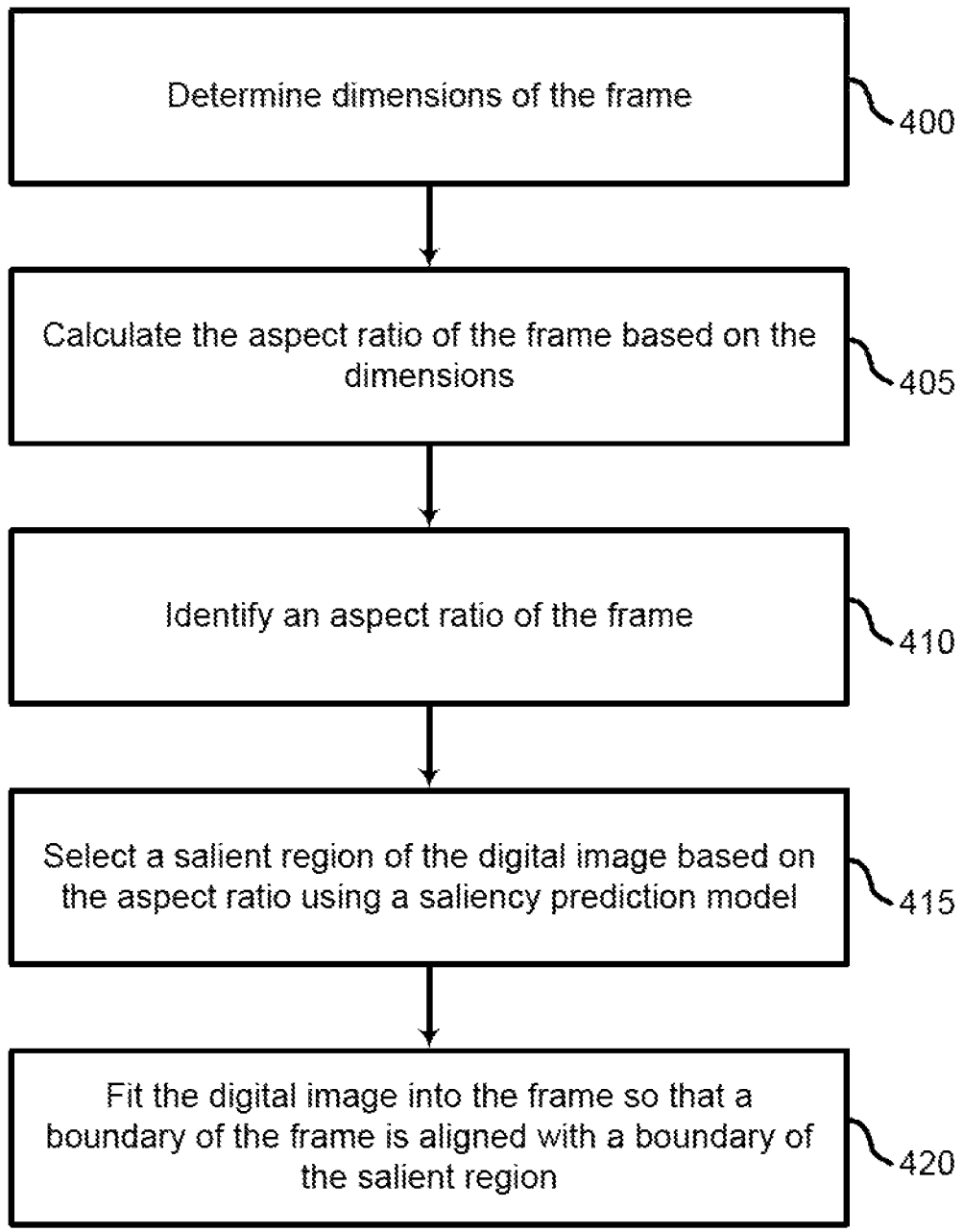
FIG. 4 shows an example of a process for identifying an aspect ratio of the frame in accordance with aspects of the present disclosure.

FIG. 4 shows an example of a process for identifying an aspect ratio of the frame in accordance with aspects of the present disclosure. In some examples, these operations may be performed by a system including a processor executing a set of codes to control functional elements of an apparatus (e.g., server 900 described with reference to FIG. 9). Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 400, the system determines dimensions of the frame. In some cases, the operations of this step may refer to, or be performed by, a frame component as described with reference to FIG. 9. The frame dimensions may include a frame height and a frame width, which may be represented in inches, millimeters, pixels, or any other suitable measurement unit. In some cases, the dimensions of the frame are set directly by a user of a publishing or image editing software.

At step 405, the system calculates the aspect ratio of the frame based on the dimensions. In some cases, the operations of this step may refer to, or be performed by, a frame component as described with reference to FIG. 9. For example, the aspect ratio may correspond to a ratio comprising the width of the frame divided by the height of the frame.

At step 410, the system identifies an aspect ratio of the frame. In some cases, the operations of this step may refer to, or be performed by, a frame component as described with reference to FIG. 9. For example, the aspect ratio may be calculated by a frame component and then passed as an input to (and thus, identified by) a saliency component. The saliency component may also take the original image (or data encoding the original image) as another input.

At step 415, the system selects a salient region of the digital image based on the aspect ratio using a saliency prediction model. In some cases, the operations of this step may refer to, or be performed by, a saliency component as described with reference to FIG. 9. In some cases, the selection may be performed using a combination of a selection algorithm and a machine learning model. For example, a saliency map may be generated using a machine learning model. Then, a number of candidate region sizes may be selected, and for each candidate region size, a number of candidate positions may be scored as a function of the saliency of the region corresponding to each candidate region size and position.

At step 420, the system fits the digital image into the frame so that a boundary of the frame is aligned with a boundary of the salient region. In some cases, the operations of this step may refer to, or be performed by, a fitting component as described with reference to FIG. 9. For example, the digital image may be stretched or compressed based on the selected candidate region size. Then the digital image may be positioned based on the position that resulted in the highest saliency score.

Figure 5:
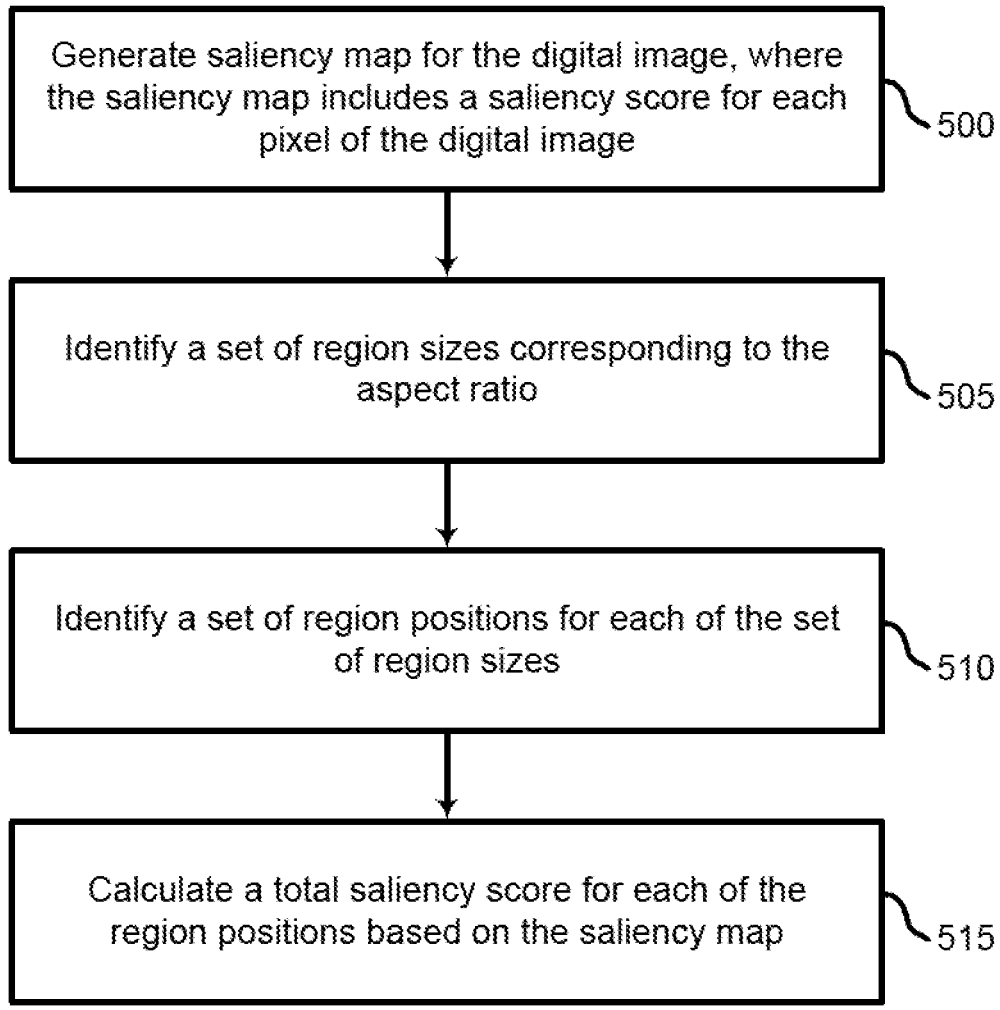
FIG. 5 shows an example of a process for selecting a salient region of the digital image based on the aspect ratio using a saliency prediction model in accordance with aspects of the present disclosure.

FIG. 5 shows an example of a process for selecting a salient region of the digital image based on the aspect ratio using a saliency prediction model in accordance with aspects of the present disclosure. In some examples, these operations may be performed by a system including processor executing a set of codes to control functional elements of an apparatus (e.g., server 900 described with reference to FIG. 9). Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 500, the system generates saliency map for the digital image, where the saliency map includes a saliency score for each pixel of the digital image. In some cases, the operations of this step may refer to, or be performed by, a saliency component as described with reference to FIG. 9.

For example, the saliency map may be generated by the saliency prediction model. In some embodiments, the saliency prediction model may comprise an artificial neural network (ANN) as described with reference to FIG. 9. That is, the saliency map may be the output of the ANN. In some cases, the saliency map constitutes a numerical value associated with each pixel of the digital image. For example, a high saliency may be represented by a 1, and a low saliency may be represented by a zero. Pixels with a high saliency may correspond to portions of the digital image that are more relevant, important or prominent. Thus, they are more likely to be included in the fitted image.

At step 505, the system identifies a set of region sizes corresponding to the aspect ratio. In some cases, the operations of this step may refer to, or be performed by, a saliency component as described with reference to FIG. 9. For example, each of the candidate region sizes may have the same aspect ratio as the frame. The number of candidates that are selected may be set based on the processing power available, or the performance level desired for the system. In some cases, limits may be applied that prevent candidate regions from representing an extreme level of compression or expansion (e.g., they may be limited to 100% increase or decrease of the scale of the image).

At step 510, the system identifies a set of region positions for each of the set of region sizes. In some cases, the operations of this step may refer to, or be performed by, a saliency component as described with reference to FIG. 9. In some cases, each of the set of positions is offset from the previous region by 1 pixel (in either the X or Y direction). In other examples, the regions may be offset by more to improve performance. Thus, the set of positions can be visualized as moving a window across the original image, and evaluating the resulting view at each position.

At step 515, the system calculates a total saliency score for each of the region positions based on the saliency map. In some cases, the operations of this step may refer to, or be performed by, a saliency component as described with reference to FIG. 9. For example, the algorithm for calculating the total saliency score for a given position might include summing the numerical values of the pixels included at that position (and for a given region size), averaging the numerical values of the included pixels, or aggregating the numerical pixel values (e.g., a weighted sum where some pixels are given more relevance than others).

Figure 6:
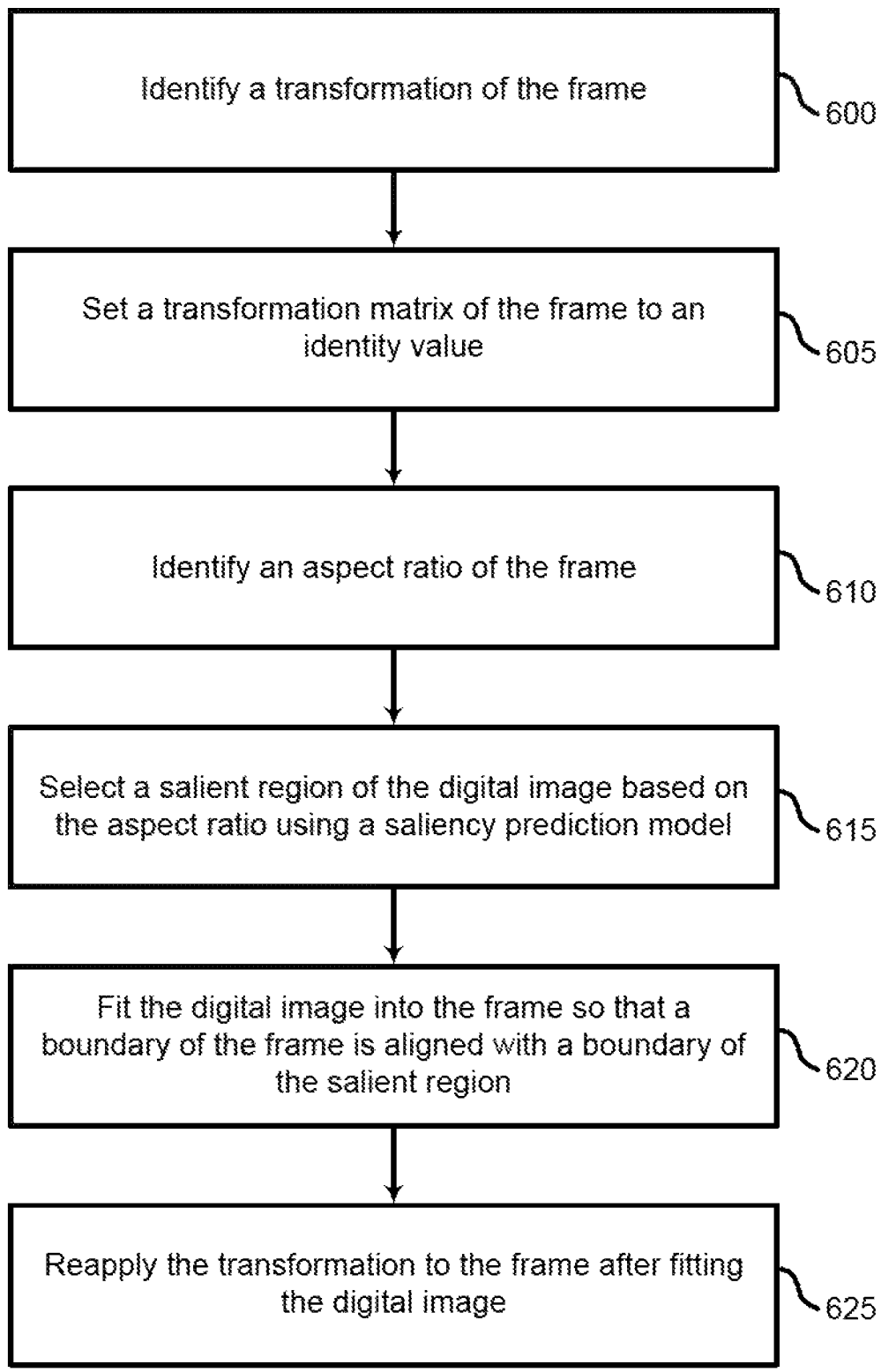
FIG. 6 shows an example of a process for fitting the digital image into the frame using image transformation in accordance with aspects of the present disclosure.

FIG. 6 shows an example of a process for fitting the digital image into the frame using image transformations so that a boundary of the frame is aligned with a boundary of the salient region in accordance with aspects of the present disclosure. In some examples, these operations may be performed by a system including processor executing a set of codes to control functional elements of an apparatus (e.g., server 900 described with reference to FIG. 9). Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 600, the system identifies a transformation of the frame. In some cases, the operations of this step may refer to, or be performed by, a transformation component as described with reference to FIG. 9. For example, transformations applied on the frame are saved. Saving the transformation may enable content aware fitting to work with rotated, flipped and mirrored frames. In some cases the transformation is represented as a transformation matrix.

At step 605, the system sets a transformation matrix of the frame to an identity value. In some cases, the operations of this step may refer to, or be performed by, a transformation component as described with reference to FIG. 9. For example, the frame's transformation matrix is then set to the identity transformation.

At step 610, the system identifies an aspect ratio of the frame. In some cases, the operations of this step may refer to, or be performed by, a frame component as described with reference to FIG. 9. For example, the frame's dimensional ratio may be determined.

At step 615, the system selects a salient region of the digital image based on the aspect ratio using a saliency prediction model. In some cases, the operations of this step may refer to, or be performed by, a saliency component as described with reference to FIG. 9. The image's salient content may be calculated depending on the frame's dimensional ratio.

At step 620, the system fits the digital image into the frame so that a boundary of the frame is aligned with a boundary of the salient region. In some cases, the operations of this step may refer to, or be performed by, a fitting component as described with reference to FIG. 9. For example, image transformations (e.g., scaling and translation) may then be calculated in the coordinate space of the frame based on the saliency of the image.

At step 625, the system reapplies the transformation to the frame after fitting the digital image. In some cases, the operations of this step may refer to, or be performed by, a transformation component as described with reference to FIG. 9. To fit the image to the frame, the transformation (e.g., represented by a transformation matrix) identified in the first step is re-applied to the frame.

Figure 7:
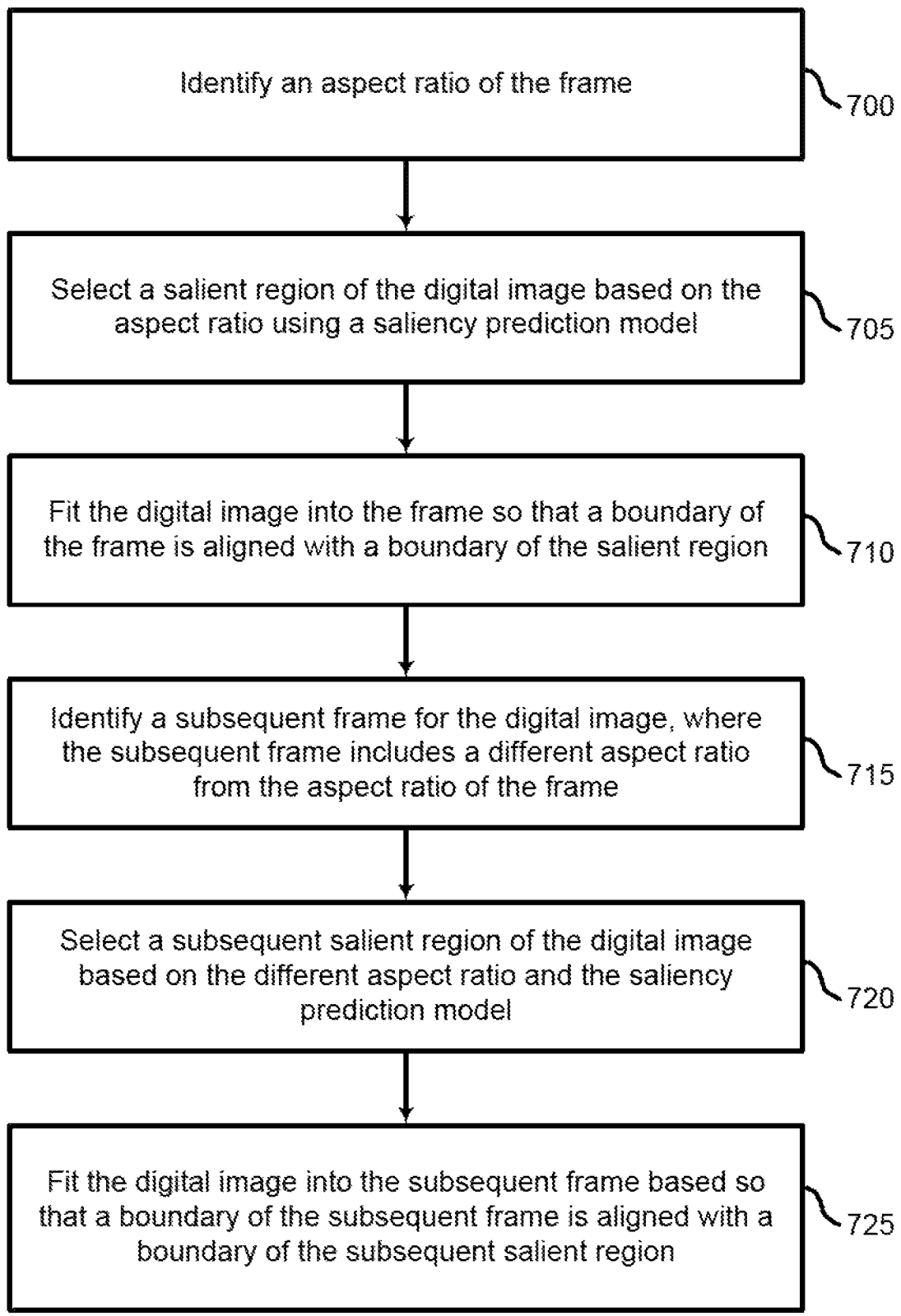
FIG. 7 shows an example of a process for dynamically fitting a digital image based on the aspect ratio of a frame in accordance with aspects of the present disclosure.

FIG. 7 shows an example of a process for dynamically fitting a digital image based on the aspect ratio of a frame in accordance with aspects of the present disclosure. In some examples, these operations may be performed by a system including processor executing a set of codes to control functional elements of an apparatus (e.g., server 900 described with reference to FIG. 9). Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 700, the system identifies an aspect ratio of the frame. In some cases, the operations of this step may refer to, or be performed by, a frame component as described with reference to FIG. 9.

At step 705, the system selects a salient region of the digital image based on the aspect ratio using a saliency prediction model. In some cases, the operations of this step may refer to, or be performed by, a saliency component as described with reference to FIG. 9.

At step 710, the system fits the digital image into the frame so that a boundary of the frame is aligned with a boundary of the salient region. In some cases, the operations of this step may refer to, or be performed by, a fitting component as described with reference to FIG. 9.

At step 715, the system identifies a subsequent frame for the digital image, where the subsequent frame includes a different aspect ratio from the aspect ratio of the frame. In some cases, the operations of this step may refer to, or be performed by, a frame component as described with reference to FIG. 9.

At step 720, the system selects a subsequent salient region of the digital image based on the different aspect ratio and the saliency prediction model. In some cases, the operations of this step may refer to, or be performed by, a saliency component as described with reference to FIG. 9.

At step 725, the system fits the digital image into the subsequent frame based so that a boundary of the subsequent frame is aligned with a boundary of the subsequent salient region. In some cases, the operations of this step may refer to, or be performed by, a fitting component as described with reference to FIG. 9.

Figure 8:
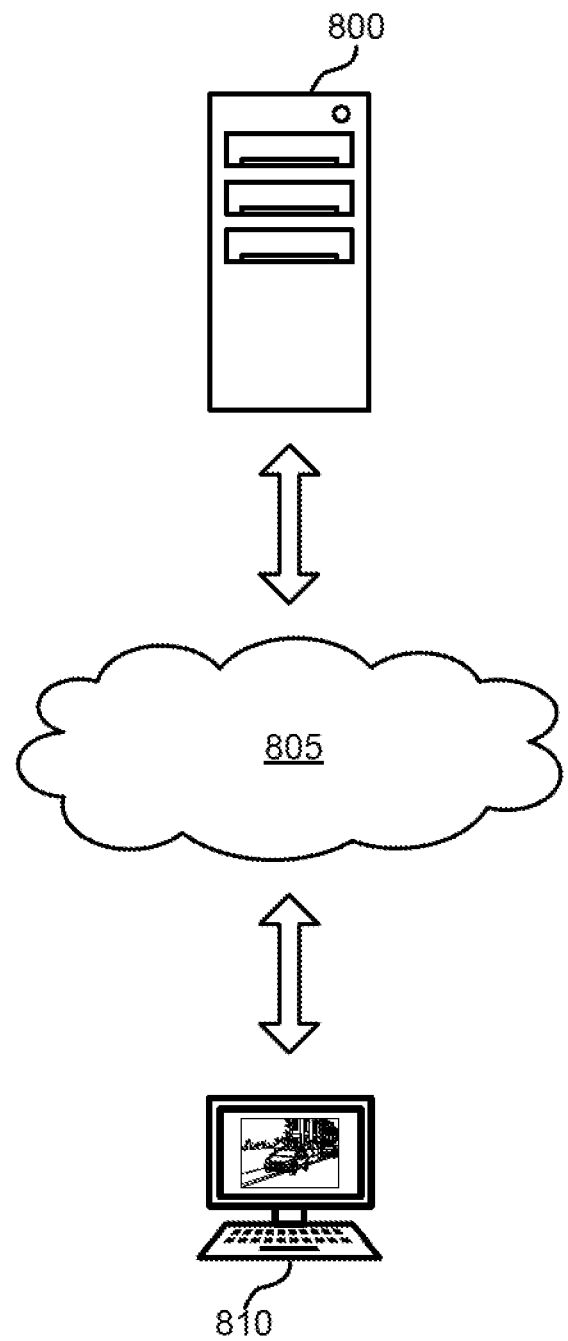
FIG. 8 shows an example of a system for fitting a digital image to a frame in accordance with aspects of the present disclosure.

FIG. 8 shows an example of a system for fitting a digital image to a frame in accordance with aspects of the present disclosure. The example shown includes server 800, network 805, and terminal 810. Server 800 may communicate with a terminal 810 via network 805 to provide an image fitting service for a user of the terminal 810. Server 800 may be an example of, or include aspects of, the corresponding element or elements described with reference to FIG. 9.

In some cases, the user may operate a publishing application or an image processing application on the terminal 810. In some embodiments, the methods described herein may be performed locally within such an application (not shown). In this case, the terminal 810 may perform functions described with respect to the server 800. In other cases, the terminal 810 communicates with the server 800 to perform these functions.

Therefore, the present disclosure provides for the real time calculation of an image's salient regions based on the aspect ratio of a frame box. The frame dimensions (i.e. a width-to-height ratio) may also be used in calculating the salient regions in the image. Thus, the salient regions of the image do not remain static. That is, the salient regions are dynamic based on the frame-dimensional information that has been passed through an input.

During fitting, embodiments of the present disclosure may fit the salient portion of the image in the frame by automatically scaling and translating the image to the frame. The described methods may be applied when the frame has been subject to transformations such as a rotation, flipping, mirroring, etc. Some embodiments assist in dealing with imagery assets for content velocity by automatically fitting images through scripted workflows, as well as Variable Data Publishing (i.e., using variable data to conditionally include images in content). According to embodiments of the present disclosure, each time the frame dimensional ratio is changed, the salient regions in the image may be re-calculated for the specific width-to-height ratio of the frame. In some embodiments, an image processing application may provide a seamless user experience by providing an embodiment of the present inventive concept within an intuitive and easy-to-use interface.

Embodiments of the present disclosure intelligently fit image content to a frame using the dimensions of the frame box as a reference. This enables the salient regions of the image to be placed inside the frame based on the dimensions of the frame box. As the frame's dimensional ratio is changed, the salient regions are recalculated, and scored, to find a suitable region for fitting within the selected frame dimensions. Therefore, the manual labor needed to appropriately fit an image within a frame with a different height-to-width ratio may be significantly reduced.

Certain embodiments allow the user to automatically set default behavior by toggling user preferences on and off. When performing a resizing of a frame, embodiments of the present disclosure can automatically invoke a content aware fitting process on the image. In some embodiments, additional features such as a control strip, a properties panel, a context menu, and a fitting dialog are available to the user.

In some embodiments, a data merge feature provides for easy creation of multiple variations of a document by merging the data source file based on content placement options. A content aware fitting option may be one among a number of placement options. When the user generates a variation of an image that has been fit using the content aware fit method, the image can be refit automatically. This reduces the number of steps users may complete in creating variations and image positioning. In some examples, publishing applications may utilize a content aware fitting method. For example, a publication application may be exposed to this capability via scripting.

Figure 9:
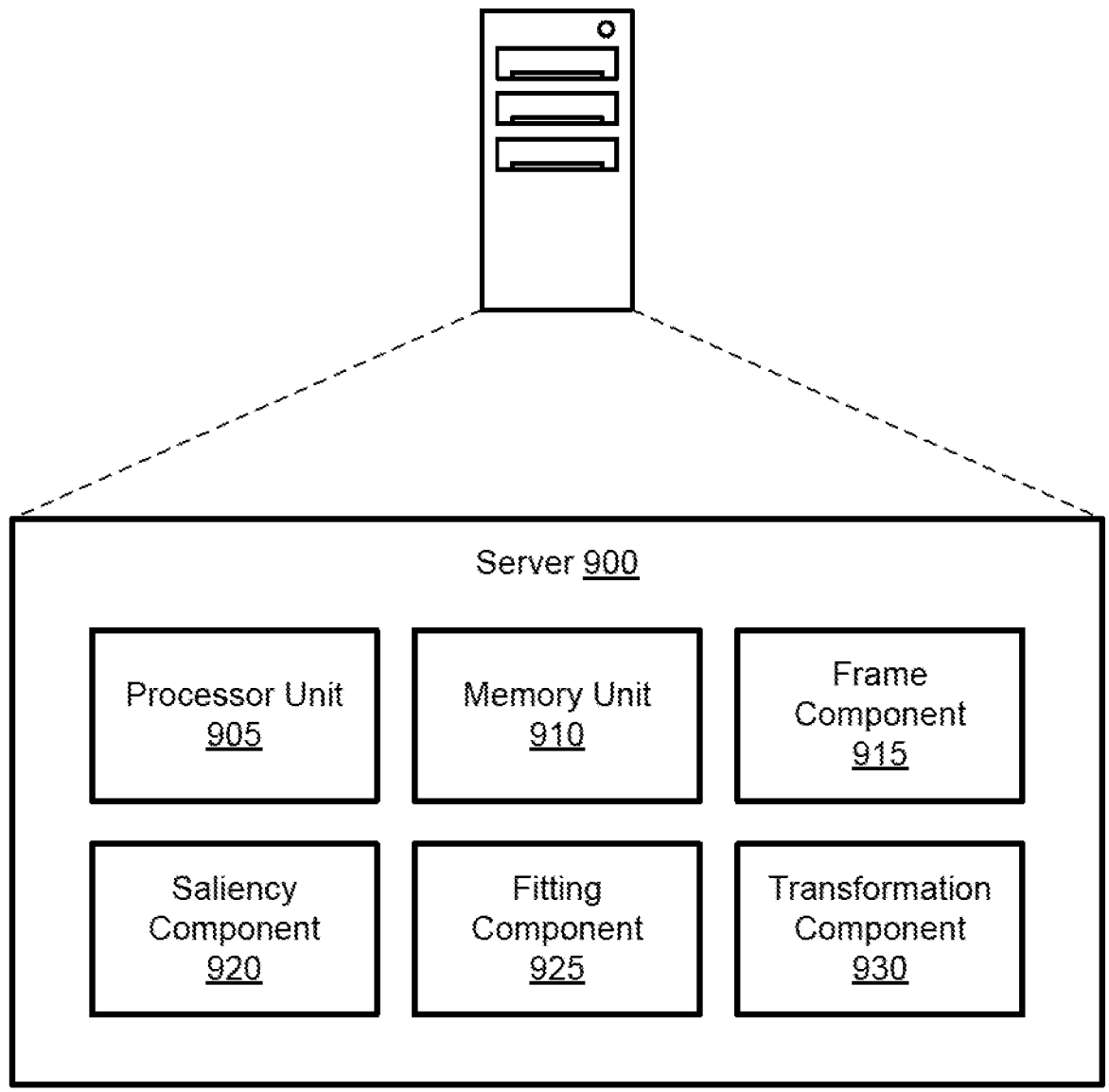
FIG. 9 shows an example of a server for fitting a digital image to a frame in accordance with aspects of the present disclosure.

FIG. 9 shows an example of a server 900 for fitting a digital image to a frame in accordance with aspects of the present disclosure. Server 900 may be an example of, or include aspects of, the corresponding element or elements described with reference to FIG. 8. Server 900 may include processor unit 905, memory unit 910, frame component 915, saliency component 920, fitting component 925, and transformation component 930.

A processor unit 905 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions related to fitting digital images as described herein.

A memory unit 910 may include random access memory (RAM), read-only memory (ROM), or a hard disk. The memory may be solid state or a hard disk drive, and may store computer-readable, computer-executable software including instructions that, when executed, cause a processor to perform various functions described herein. In some cases, the memory may contain, among other things, a BIOS which may control basic hardware or software operation such as the interaction with peripheral components or devices.

Frame component 915 identifies an aspect ratio of the frame. Frame component 915 may also determine dimensions of the frame. Frame component 915 may also calculate the aspect ratio of the frame based on the dimensions. Frame component 915 may also receive sizing input from a user, where the dimensions are determined based on the sizing input, and where the digital image is fit into the frame in real time based on the sizing input. Frame component 915 may also identify a subsequent frame for the digital image, where the subsequent frame includes a different aspect ratio from the aspect ratio of the frame.

Saliency component 920 selects a salient region of the digital image based on the aspect ratio using a saliency prediction model. Saliency component 920 may also generate a saliency map for the digital image, where the saliency map includes a saliency score for each pixel of the digital image. Saliency component 920 may also identify a set of region sizes corresponding to the aspect ratio. Saliency component 920 may also identify a set of region positions for each of the set of region sizes. Saliency component 920 may also calculate a total saliency score for each of the region positions based on the saliency map, where the salient region is selected based on the total saliency score.

In some cases, saliency component 920 may also identify semantic information of the digital image, where the saliency prediction model is based on the semantic information. In some examples, the saliency prediction model includes a machine learning model. Saliency component 920 may also identify a training set including a set of input images and a corresponding set of salient regions. Saliency component 920 may also train the saliency prediction model based on the training set.

In some cases, the saliency prediction model of the saliency component 920 may include an artificial neural network (ANN). An ANN may be a hardware or a software component that includes a number of connected nodes (a.k.a., artificial neurons), which may be seen as loosely corresponding to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

In some cases, the ANN may include a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input (i.e., in order to identify salient features within an image).

Fitting component 925 fits the digital image into the frame so that a boundary of the frame is aligned with a boundary of the salient region. Fitting component 925 may also fit the digital image into the subsequent frame so that a boundary of the subsequent frame is aligned with a boundary of the subsequent salient region. Fitting component 925 may also identify a content aware fit setting, where the digital image is fit into the frame based on the content aware fit setting. As used herein, a content aware fit setting may refer to any user controlled application setting that enables a salient region of the digital image to be fit into a frame using a saliency prediction model, and further based on the aspect ratio of the frame.

Transformation component 930 may identify a transformation of the frame. Transformation component 930 may also set a transformation matrix of the frame to an identity value. Transformation component 930 may also reapply the transformation to the frame after fitting the digital image.

Accordingly, the present disclosure includes the following embodiments.

A method for dynamically fitting a digital image based on the aspect ratio of a frame is described. The method may include identifying an aspect ratio of the frame, selecting a salient region of the digital image based on the aspect ratio using a saliency prediction model, and fitting the digital image into the frame so that a boundary of the frame is aligned with a boundary of the salient region.

An apparatus for dynamically fitting a digital image based on the aspect ratio of a frame is described. The apparatus may include a processor, memory in electronic communication with the processor, and instructions stored in the memory. The instructions may be operable to cause the processor to identify an aspect ratio of the frame, select a salient region of the digital image based on the aspect ratio using a saliency prediction model, and fit the digital image into the frame so that a boundary of the frame is aligned with a boundary of the salient region.

A non-transitory computer readable medium storing code for dynamically fitting a digital image based on the aspect ratio of a frame is described. In some examples, the code comprises instructions executable by a processor to: identify an aspect ratio of the frame, select a salient region of the digital image based on the aspect ratio using a saliency prediction model, and fit the digital image into the frame so that a boundary of the frame is aligned with a boundary of the salient region.

Some examples of the method, apparatus, and non-transitory computer readable medium described above may further include determining dimensions of the frame. Some examples may further include calculating the aspect ratio of the frame based on the dimensions. Some examples of the method, apparatus, and non-transitory computer readable medium described above may further include receiving sizing input from a user, wherein the dimensions are determined based on the sizing input, and wherein the digital image is fit into the frame in real time based on the sizing input.

Some examples of the method, apparatus, and non-transitory computer readable medium described above may further include generating saliency map for the digital image, wherein the saliency map comprises a saliency score for each pixel of the digital image. Some examples may further include identifying a plurality of region sizes corresponding to the aspect ratio. Some examples may further include identifying a plurality of region positions for each of the plurality of region sizes. Some examples may further include calculating a total saliency score for each of the region positions based on the saliency map, wherein the salient region is selected based on the total saliency score.

Some examples of the method, apparatus, and non-transitory computer readable medium described above may further include identifying semantic information of the digital image, wherein the saliency prediction model is based at least in part on the semantic information. For example, the saliency prediction model may comprise a machine learning model that outputs semantic information such as information identifying relevant objects in the image. The digital image may be fit to the frame in a way that includes a high portion of the relevant objects (e.g., as described above with reference to FIG. 4).

Some examples of the method, apparatus, and non-transitory computer readable medium described above may further include identifying a training set comprising a set of input images and a corresponding set of salient regions. Some examples may further include training the saliency prediction model based on the training set.

Some examples of the method, apparatus, and non-transitory computer readable medium described above may further include identifying a transformation of the frame. Some examples may further include setting a transformation matrix of the frame to an identity value. Some examples may further include reapply the transformation to the frame after fitting the digital image.

Some examples of the method, apparatus, and non-transitory computer readable medium described above may further include identifying a subsequent frame for the digital image, wherein the subsequent frame comprises a different aspect ratio from the aspect ratio of the frame. Some examples may further include selecting a subsequent salient region of the digital image based on the different aspect ratio and the saliency prediction model. Some examples may further include fitting the digital image into the subsequent frame based so that a boundary of the subsequent frame is aligned with a boundary of the subsequent salient region.

Some examples of the method, apparatus, and non-transitory computer readable medium described above may further include identifying a content aware fit setting, wherein the digital image is fit into the frame based on the content aware fit setting.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for fitting a digital image to a frame, comprising:
   identifying an aspect ratio of a frame;
   selecting a salient region of the digital image based on the aspect ratio using a saliency prediction model, wherein the saliency prediction model comprises a machine learning model that is trained based on a training set comprising a set of input images and a corresponding set of salient regions; and
   fitting the digital image into the frame so that a boundary of the frame is aligned with a boundary of the salient region.

2. The method of claim 1, further comprising:
   determining dimensions of the frame; and
   calculating the aspect ratio of the frame based on the dimensions.

3. The method of claim 2, further comprising:
   receiving sizing input from a user, wherein the dimensions are determined based on the sizing input, and wherein the digital image is fir into the frame in real time based on the sizing input.

4. The method of claim 1, further comprising:
   generating saliency map for the digital image, wherein the saliency map comprises a saliency score for each pixel of the digital image;
   identifying a plurality of region sizes corresponding to the aspect ratio;
   identifying a plurality of region positions for each of the plurality of region sizes; and
   calculating a total saliency score for each of the region positions based on the saliency map, wherein the salient region is selected based on the total saliency score.

5. The method of claim 1, further comprising:
   identifying semantic information of the digital image, wherein the saliency prediction model is based at least in part on the semantic information.

6. The method of claim 1, further comprising:
   identifying a training set comprising a set of input images and a corresponding set of salient regions; and
   training the saliency prediction model based on the training set.

7. The method of claim 1, further comprising:
   identifying a subsequent frame for the digital image, wherein the subsequent frame comprises a different aspect ratio from the aspect ratio of the frame;
   selecting a subsequent salient region of the digital image based on the different aspect ratio and the saliency prediction model; and
   fitting the digital image into the subsequent frame so that a boundary of the subsequent frame is aligned with a boundary of the subsequent salient region.

8. The method of claim 1, further comprising:
   identifying a content aware fit setting, wherein the digital image is fit into the frame based on the content aware fit setting.

9. An apparatus for fitting a digital image based on an aspect ratio of a frame, comprising:
   a processor and a memory storing instructions and in electronic communication with the processor, the processor being configured to execute the instructions to:

generate a saliency map for the digital image, wherein the saliency map comprises a saliency score for each pixel of the digital image;
identify a plurality of region sizes corresponding to an aspect ratio of a frame;
identify a plurality of region positions for each of the plurality of region sizes;
calculate a total saliency score for each of the region positions based on the saliency map;
select a salient region of the digital image based on the total saliency score for each of the region positions; and
fit the digital image into the frame so that a boundary of the frame is aligned with a boundary of the salient region.

10. The apparatus of claim 9, wherein the processor is further configured to execute the instructions to:
determine dimensions of the frame; and
calculate the aspect ratio of the frame based on the dimensions.

11. The apparatus of claim 9, the processor being further configured to execute the instructions to:
identify semantic information of the digital image, wherein the saliency map is based at least in part on the semantic information.

12. The apparatus of claim 9, the processor being further configured to execute the instructions to:
identify a transformation of the frame;
set a transformation matrix of the frame to an identity value; and
reapply the transformation to the frame after fitting the digital image.

13. The apparatus of claim 9, the processor being further configured to execute the instructions to:
identify a subsequent frame for the digital image, wherein the subsequent frame comprises a different aspect ratio from the aspect ratio of the frame;
select a subsequent salient region of the digital image based on the different aspect ratio; and
fit the digital image into the subsequent frame based so that a boundary of the subsequent frame is aligned with a boundary of the subsequent salient region.

14. A non-transitory computer readable medium storing code for dynamically fitting a digital image based on an aspect ratio of a frame, the code comprising instructions executable by a processor to:
receive sizing input for a frame from a user;
identify an aspect ratio of the frame based on the sizing input;
select a salient region of the digital image based on the aspect ratio;
dynamically fit the digital image into the frame in real time so that a boundary of the frame is aligned with a boundary of the salient region;
identify a subsequent frame for the digital image, wherein the subsequent frame comprises a different aspect ratio from the aspect ratio of the frame;
select a subsequent salient region of the digital image based on the different aspect ratio and the saliency prediction model; and
fit the digital image into the subsequent frame so that a boundary of the subsequent frame is aligned with a boundary of the subsequent salient region.

15. The non-transitory computer readable medium of claim 14, the code further comprising instructions executable by the processor to:
determine dimensions of the frame; and
calculate the aspect ratio of the frame based on the dimensions.

16. The non-transitory computer readable medium of claim 14, the code further comprising instructions executable by the processor to:
generate a saliency map for the digital image, wherein the saliency map comprises a saliency score for each pixel of the digital image;
identify a plurality of region sizes corresponding to the aspect ratio;
identify a plurality of region positions for each of the plurality of region sizes; and
calculate a total saliency score for each of the region positions based on the saliency map, wherein the salient region is selected using a saliency prediction model based on the total saliency score.

17. The non-transitory computer readable medium of claim 14, the code further comprising instructions executable by the processor to:
identify a content aware fit setting, wherein the digital image is fit into the frame based on the content aware fit setting.

* * * * *